(12) United States Patent
Kalhan

(10) Patent No.: US 11,558,145 B2
(45) Date of Patent: Jan. 17, 2023

(54) ROBUST RELAYING INFORMATION TRANSMITTED TO ORIGINATION DEVICE

(71) Applicants: Kyocera Corporation, Kyoto (JP); Amit Kalhan, San Diego, CA (US)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 178 days.

(21) Appl. No.: 17/040,699

(22) PCT Filed: Mar. 14, 2019

(86) PCT No.: PCT/US2019/022216
§ 371 (c)(1),
(2) Date: Sep. 23, 2020

(87) PCT Pub. No.: WO2019/203964
PCT Pub. Date: Oct. 24, 2019

(65) Prior Publication Data
US 2021/0058188 A1    Feb. 25, 2021

Related U.S. Application Data

(60) Provisional application No. 62/659,014, filed on Apr. 17, 2018.

(51) Int. Cl.
*H04L 1/00* (2006.01)
*H04B 7/155* (2006.01)

(52) U.S. Cl.
CPC ....... *H04L 1/0035* (2013.01); *H04B 7/15557* (2013.01); *H04L 1/0009* (2013.01); *H04L 1/0026* (2013.01)

(58) Field of Classification Search
CPC ... H04L 1/0035; H04L 1/0009; H04L 1/0026; H04L 1/08; H04L 63/065; H04L 1/18;
(Continued)

(56) References Cited

U.S. PATENT DOCUMENTS 7,907,055 B2 * 3/2011 Hardy .................... H04B 7/155
340/572.1
10,630,430 B2 * 4/2020 Kalhan ................. H04L 1/1825
(Continued)

FOREIGN PATENT DOCUMENTS

| EP | 1852986 B1 | 1/2013 | |
|----|------------|--------|---|
| KR | 100871620 B1 * | 12/2008 | ...... H04W 36/00835 |
| WO | WO-2011025206 A2 * | 3/2011 | ............. H04B 7/155 |

*Primary Examiner* — Lana N Le

(57) ABSTRACT

An origination device (e.g., a base station) receives relaying information from a signal forwarding device in a grant or a broadcast message. The relaying information can be information pertaining to channel conditions and/or quality (e.g., a Channel Quality Indicator) of a first communication link between the signal forwarding device and a destination device, and/or an encoding rate based on channel conditions associated with the first communication link. The origination device utilizes the relaying information to determine a first set of encoding parameters that correspond to channel conditions associated with the first communication link between the signal forwarding device and a destination device. The origination device encodes a first set of data according to the first set of encoding parameters and transmits the encoded first set of data to the signal forwarding device. The signal forwarding device transmits the encoded first set of data to the destination device.

18 Claims, 4 Drawing Sheets

(58) Field of Classification Search
CPC ... H04L 45/566; H04L 12/189; H04L 51/214; H04L 63/10; H04B 7/15557; H04B 7/15528; H04B 7/14; H04B 7/15542; H04B 7/0632; H04B 7/15; H04B 7/026; H04W 84/047; H04W 88/04; H04W 72/042; H04W 72/0406; H04W 40/22; H04W 72/1289; H04W 52/241; H04W 72/085

See application file for complete search history.

(56) References Cited

U.S. PATENT DOCUMENTS

| | | | |
|---|---|---|---|
| 11,153,040 B2* | 10/2021 | Kalhan | H04B 7/15528 |
| 2005/0276259 A1* | 12/2005 | Nakabayashi | H04L 1/0072 |
| | | | 370/349 |
| 2008/0056199 A1 | 3/2008 | Park et al. | |
| 2008/0285502 A1* | 11/2008 | Deng | H04B 7/155 |
| | | | 370/315 |
| 2010/0039947 A1 | 2/2010 | Li et al. | |
| 2010/0128622 A1* | 5/2010 | Horiuchi | H04B 7/2606 |
| | | | 370/252 |
| 2011/0122933 A1* | 5/2011 | Adam | H04B 7/15592 |
| | | | 375/219 |
| 2015/0318962 A1* | 11/2015 | Khayrallah | H04L 1/1887 |
| | | | 370/230 |
| 2017/0214493 A1* | 7/2017 | Hampel | H04L 1/1887 |
| 2020/0136733 A1* | 4/2020 | Hassan | H04B 7/15528 |
| 2020/0351889 A1* | 11/2020 | Bai | H04W 76/10 |
| 2021/0175999 A1* | 6/2021 | Kittichokechai | H04L 1/0016 |

\* cited by examiner

ROBUST RELAYING INFORMATION TRANSMITTED TO ORIGINATION DEVICE

CLAIM OF PRIORITY

The present application claims priority to Provisional Application No. 62/659,014, entitled "ROBUST RELAYING INFORMATION TRANSMITTED IN GRANTS," filed Apr. 17, 2018, assigned to the assignee hereof and hereby expressly incorporated by reference in its entirety.

FIELD

This invention generally relates to wireless communications and more particularly to transmitting relaying information to an origination device.

BACKGROUND

Some communication systems utilize a signal forwarding device, such as a repeater station, relay station or a self-backhauled station to facilitate the transfer of information between user equipment (UE) devices and a core network. The signal forwarding device is typically not connected directly to the core network but still provides service to the UE devices by forwarding information to and from the UE devices and a base station, which is connected to the core network. Where the signal forwarding device is a repeater, the repeater simply retransmits downlink signals received from another base station to the UE device and retransmits uplink signals received from the UE device to the other base station. Although the repeater may apply limited signal processing to the incoming signal such as filtering, frequency shifting, and amplification, a repeater will not decode the incoming signal that is to be forwarded. Relay stations and self-backhaul stations perform at least some signal processing before retransmitting the information. Such processing can vary from partial decoding to complete decoding of the incoming signal. For example, the incoming signal can be completely decoded and used to generate a new signal or the incoming signal may not be completely decoded but still used to transmit the forwarded outgoing signal. Some of the various levels of processing (forwarding techniques) are sometimes referred to as amplify and forward (AF), partial decoding and forward (PDF), and decode and forward (DF) schemes.

SUMMARY

An origination device (e.g., a base station) receives relaying information from a signal forwarding device in a grant or a broadcast message. The relaying information can be information pertaining to channel conditions and/or quality (e.g., a Channel Quality Indicator) of a first communication link between the signal forwarding device and a destination device, and/or an encoding rate based on channel conditions associated with the first communication link. The origination device utilizes the relaying information to determine a first set of encoding parameters that correspond to channel conditions associated with the first communication link between the signal forwarding device and a destination device. The origination device encodes a first set of data according to the first set of encoding parameters and transmits the encoded first set of data to the signal forwarding device. The signal forwarding device transmits the encoded first set of data to the destination device.

DETAILED DESCRIPTION

Figure 1A:
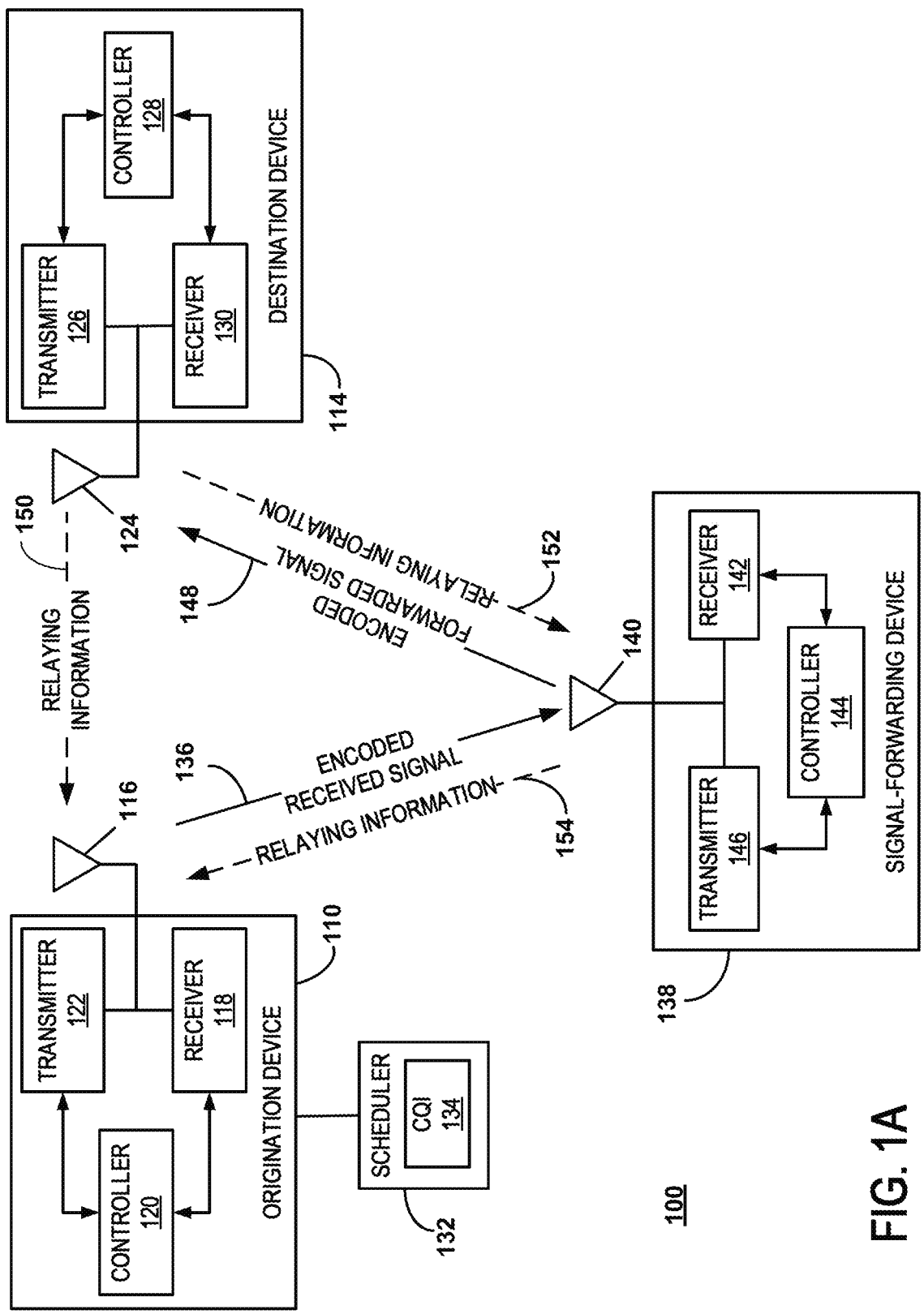
FIG. 1A is a block diagram of an example of a wireless communication system including an origination device, a signal forwarding device, and a destination device.

As discussed above, communication systems often employ repeaters, relays and self-backhauled base stations to forward signals transmitted between base stations and the UE devices served by the base stations. Signals may be forwarded from the base station to the UE device, from the UE device to the base station, or both. In some systems, scheduling of communication resources for the communication channel between the signal forwarding device (e.g., repeater, relay, etc.) and the UE device is performed by a scheduler at the base station or a central scheduler connected to the base station. In the examples discussed herein, it is assumed that the scheduler is located at, or connected to, a base station to/from which the signal forwarding device forwards signals. However, the scheduler may not be physically located at the base station and may be located at any other suitable location (e.g., at the signal forwarding device or elsewhere in the radio access network to which the base station belongs).

In a typical relay scenario, an anchor base station would only single-encode data, which is intended for a destination device, using encoding parameters that are appropriate for the channel conditions between the base station and the relay node. Upon receipt of the transmission from the base station, the relay node would decode the data and subsequently encode the data using encoding parameters that are appropriate for the channel conditions between the relay and the destination device (e.g., UE device). One drawback of such a scenario is the additional processing delay experienced at the relay while the relay encodes the data before transmitting the data to the destination device. However, for some of the examples discussed herein, various methods, devices, and systems will be described in which an anchor base station transmits a dual-encoded set of data that does not require any encoding by the signal forwarding device (e.g., relay). In other examples discussed herein, various methods, devices, and systems will be described in which an anchor base station transmits a single-encoded set of data that does not require any encoding by the signal forwarding device (e.g., relay).

Since the signal forwarding device is central to the examples, the nomenclature used throughout the description centers on the signal forwarding device. More specifically, an "origination device" is a device from which a signal is transmitted to the signal forwarding device, and the signal being received at the signal forwarding device from an origination device is referred to as a "received signal." Similarly, a "destination device" is a device to which the signal forwarding device transmits a signal, which is referred to herein as a "forwarded signal." Moreover, although most of the following examples refer to a base station as the "origination device" and to a UE device as the "destination device," the examples may be modified so that the UE device is the "origination device," and the base station is the "destination device."

FIG. 1A is a block diagram of an example of a wireless communication system 100 including an origination device, a signal forwarding device, and a destination device. The origination device 110 and destination device 114 may be any kind of wireless communication devices and may be stationary or portable. For the examples discussed herein, the origination device 110 is a base station, and the destination device 114 is a user equipment (UE) device such as a handset. However, the devices 110, 114 may be different types of devices in other circumstances. For example, both devices may be UE devices. In some situations, the origination device, the signal forwarding device, and the destination device are all UE devices.

In the example of FIG. 1A, origination device 110 provides downlink wireless communication service to destination device 114. Thus, destination device 114 receives downlink signals (not shown) from origination device 110, either directly or via signal forwarding device 138. The downlink signals are received at the destination device 114 through antenna 124 and receiver 130. Destination device 114 further comprises a controller 128 and a transmitter 126. Origination device 110 transmits the downlink signals to destination device 114 and to signal forwarding device 138 via antenna 116 and transmitter 122.

Origination device 110 further comprises controller 120 and receiver 118, as well as other electronics, hardware, and code. The origination device 110 is any fixed, mobile, or portable equipment that performs the functions described herein. The various functions and operations of the blocks described with reference to the origination device 110 may be implemented in any number of devices, circuits, or elements. Two or more of the functional blocks may be integrated in a single device, and the functions described as performed in any single device may be implemented over several devices.

For the example shown in FIG. 1A, the origination device 110 may be a fixed device or apparatus that is installed at a particular location at the time of system deployment. Examples of such equipment include fixed base stations or fixed transceiver stations. In some situations, the origination device 110 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the origination device 110 may be a portable device that is not fixed to any particular location. Accordingly, the origination device 110 may be a portable user device such as a UE device in some circumstances.

The controller 120 includes any combination of hardware, software, and/or firmware for executing the functions described herein as well as facilitating the overall functionality of the origination device 110. An example of a suitable controller 120 includes code running on a microprocessor or processor arrangement connected to memory. The transmitter 122 includes electronics configured to transmit wireless signals. In some situations, the transmitter 122 may include multiple transmitters. The receiver 118 includes electronics configured to receive wireless signals. In some situations, the receiver 118 may include multiple receivers. The receiver 118 and transmitter 122 receive and transmit signals, respectively, through an antenna 116. The antenna 116 may include separate transmit and receive antennas. In some circumstances, the antenna 116 may include multiple transmit and receive antennas.

The transmitter 122 and receiver 118 in the example of FIG. 1A perform radio frequency (RF) processing including modulation and demodulation. The receiver 118, therefore, may include components such as low noise amplifiers (LNAs) and filters. The transmitter 122 may include filters and amplifiers. Other components may include isolators, matching circuits, and other RF components. These components in combination or cooperation with other components perform the origination device functions. The required components may depend on the particular functionality required by the origination device.

Figure 1B:
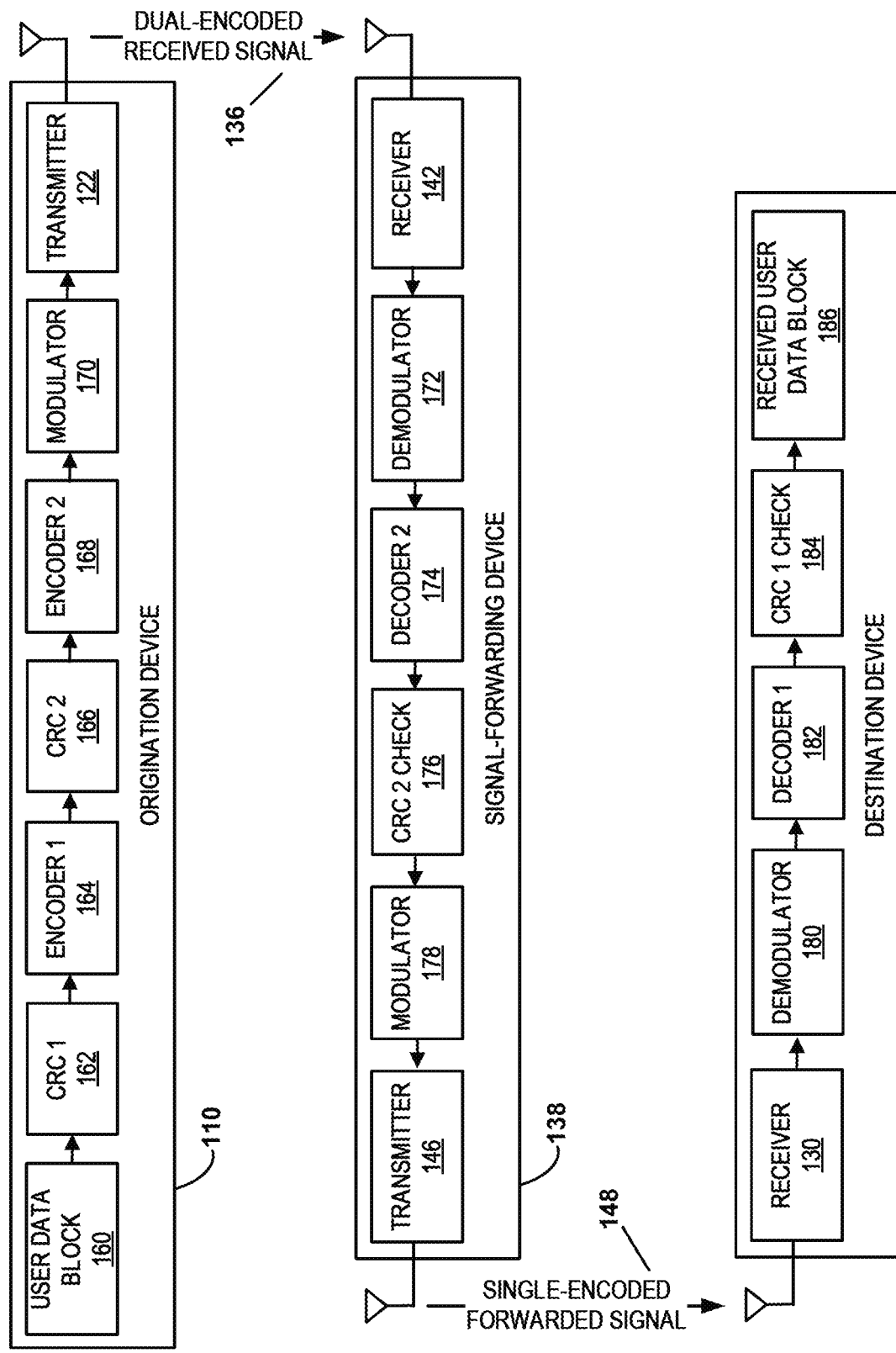
FIG. 1B is a block diagram of an example of the circuitry utilized within an origination device, a signal forwarding device, and a destination device to transmit dual-encoded data.

The receiver 118 includes a demodulator (not shown), and the transmitter 122 includes modulator 170 (shown in FIG. 1B). The demodulator of receiver 118 demodulates any signals received at the origination device 110 in accordance with one of a plurality of modulation orders. The modulator 170 modulates the signals to be transmitted as part of an encoded received signal 136 that is transmitted by origination device 110 and received by signal forwarding device 138. In modulating the signals, the modulator 170 can apply any one of a plurality of modulation orders. In some examples, the encoded received signal 136 is single-encoded, and in other examples, the encoded received signal 136 is dual-encoded.

Scheduler 132 is located at origination device 110 in the example shown in FIG. 1A. However, the system 100 could be modified so that the scheduler 132 is located at any other suitable location. Regardless of the location of scheduler 132, the system 100 may be configured so that multiple entities within the radio access network (e.g., different origination devices, different signal forwarding devices, and different destination devices) can access the scheduler 132. For example, in an ad-hoc topology, a first origination device can access the scheduler 132 and transmit a dual-encoded received signal to the signal forwarding device at a given time, but a second origination device can access the scheduler 132 and transmit a dual-encoded received signal to the signal forwarding device at a second, different time.

The scheduler may be an application running on equipment connected directly to origination device 110 or connected through a backhaul or other communication link. Regardless of the location of scheduler 132, channel quality information (CQI) 134 regarding the various communication links within the system 100 is provided to scheduler 132, which uses the CQI 134 to schedule communication resources to be used by the various entities within the system 100. For the example shown in FIG. 1A, the scheduler 132 utilizes CQI pertaining to the communication link between the origination device 110 and the destination device 114, CQI pertaining to the communication link between the origination device 110 and the signal forwarding device 138, and CQI pertaining to the communication link between the signal forwarding device 138 and the destination device 114. Based on the channel quality for at least one of these three communication links, the scheduler 132 schedules communication resources.

In the example shown in FIG. 1A, origination device 110 receives, via antenna 116 and receiver 118, relaying information 154 from signal forwarding device 138. The relaying information 154 is (1) information associated with one or more communication links in system 100, and (2) utilized to relay information from origination device 110 to destination device 114, via signal forwarding device 138. For example, the relaying information 154 includes one or more of the following: (1) information pertaining to channel conditions and/or quality (e.g., a Channel Quality Indicator) of the communication link between signal forwarding device 138 and destination device 114, (2) information pertaining to channel conditions and/or quality (e.g., a Channel Quality Indicator) of the communication link between origination device 110 and signal forwarding device 138, (3) an encoding rate based on channel conditions associated with the communication link between signal forwarding device 138 and destination device 114, and (4) an encoding rate based on channel conditions associated with the communication link between origination device 110 and signal forwarding device 138.

In the example shown in FIG. 1A, signal forwarding device 138 transmits, via transmitter 146 and antenna 140, relaying information 154 to origination device 110. In some cases, signal forwarding device 138 transmits the relaying information 154 in a grant message to origination device 110. In other cases, signal forwarding device 138 transmits the relaying information 154 in a broadcast message (e.g., a System Information Block message).

In other examples, origination device 110 may receive relaying information 150 directly from destination device 114. Alternatively, destination device 114 may transmit relaying information 152 to signal forwarding device 138, which subsequently transmits relaying information 154, based on relaying information 152, to origination device 110. In some cases, relaying information 154 is a retransmission of relaying information 152. In other cases, relaying information 154 is a modified version of relaying information 152.

In the instances where signal forwarding device 138 provides relaying information 154 to origination device 110, signal forwarding device 138 may use a channel estimator to measure (1) the channel conditions/quality of the communication link between signal forwarding device 138 and destination device 114, and/or (2) the channel conditions/quality of the communication link between origination device 110 and signal forwarding device 138. Alternatively, signal forwarding device 138 may receive measurements of the channel conditions/quality of the communication link between signal forwarding device 138 and destination device 114 as feedback (e.g., relaying information 152) from destination device 114. Whether the measurements are taken by signal forwarding device 138 or destination device 114, signal forwarding device 138 may determine the relaying information 154 to send to origination device 110, based on the measurements.

In the example shown in FIG. 1A, upon receipt of the relaying information 154, origination device 110 utilizes controller 120 to determine a set of encoding parameters that correspond to the relaying information 154 associated with the communication link between signal forwarding device 138 and destination device 114. The set of encoding parameters include the encoding rate and the modulation order to be used by origination device 110 when encoding data to be transmitted to signal forwarding device 114. In a multi-hop scenario that utilizes dual-encoded data, which will be discussed more fully below, the user data is encoded twice, using two sets of encoding parameters that correspond to the channel conditions of the respective multi-hop communication links.

However, in a multi-hop scenario that utilizes single-encoded data, the encoding parameters are chosen based on the worst channel of the multi-hop communication links. For example, in cases where the communication link between the origination device 110 and the signal forwarding device 138 is a fixed link, the encoding parameters will generally correspond to the relaying information 154 associated with the communication link between signal forwarding device 138 and destination device 114. One example of this situation would be where several small Machine Type Communications (MTC) devices (e.g., destination devices) access the network via an aggregate node (AN) (e.g., signal forwarding device), and the AN connects to the network via a backhaul link to a base station (e.g., origination device). Since the communication link between the base station and the AN is a fixed link, the encoding parameters would correspond to the channel conditions/quality of the communication link between the AN and the MTC devices.

After determining the set of encoding parameters that correspond to the relaying information 154 associated with the communication link between signal forwarding device 138 and destination device 114, origination device 110 utilizes controller 120 to encode a set of data according to the set of encoding parameters. After the set of data is encoded, origination device 110 transmits, via transmitter 122 and antenna 116, the encoded set of data (e.g., encoded received signal 136) to signal forwarding device 138. Signal forwarding device 138 receives the encoded received signal 136 via antenna 140 and receiver 142.

Upon receipt of the encoded received signal 136, signal forwarding device 138 transmits, via transmitter 146 and antenna 140, encoded forwarded signal 148 to destination device 114. The encoded forwarded signal 148 is based on encoded received signal 136. In some cases, the encoded forwarded signal 148 is a retransmission of encoded received signal 136. In other cases, the encoded forwarded signal 148 is a modified version of the encoded received signal 136.

The remainder of the discussion regarding FIG. 1A will now be described in conjunction with FIG. 1B and will focus primarily on examples in which origination device 110 dual-encodes data to be relayed to destination device 114 via signal forwarding device 138. However, any of the concepts/configurations described in connection with the dual-encoded examples may also be utilized in conjunction with the single-encoded examples.

FIG. 1B is a block diagram of an example of the circuitry utilized within an origination device, a signal forwarding device, and a destination device to transmit dual-encoded data. For example, the various blocks shown in FIG. 1B represent circuitry that is configured to perform various functions and processes described herein. Although each function is shown as a separate box, the circuitry that actually performs the recited functions for each box may be configured to perform the functions for multiple boxes. For example, a controller within the origination device, the signal forwarding device, and/or the destination device may be the circuitry that is configured to perform one or more of the functions shown in FIG. 1B.

The origination device 110 and destination device 114 may be any kind of wireless communication devices and may be stationary or portable. For the examples discussed herein, the origination device 110 is a base station, and the destination device 114 is a user equipment (UE) device such as a handset. However, the devices 110, 114 may be different types of devices in other circumstances. For example, both devices may be UE devices. In some situations, the origination device, the signal forwarding device, and the destination device are all UE devices.

In the example of FIG. 1B, origination device 110 provides downlink wireless communication service to destination device 114. Thus, destination device 114 receives downlink signals from origination device 110, either directly or via signal forwarding device 138. In the example of FIG. 1B, origination device 110 transmits a dual-encoded data signal to signal forwarding device 138, and signal forwarding device 138 forwards a single-encoded data signal to the destination device 114.

For example, origination device 110 either generates the user data block 160 or receives the user data block 160 from another entity within the radio access network. The user data block 160 is also referred to herein as a "first set of data." The origination device 110 has circuitry configured to add a first cyclic redundancy check value (CRC 1) 162 to the user data block 160. The CRC is an error-detecting code that is used to detect accidental changes to raw data. Although the examples shown herein utilize CRC, any suitable error-detection techniques may be used.

After adding CRC 1, the user data block 160 is encoded by Encoder 1, 164. Encoder 1 encodes the user data block 160 according to a first set of encoding parameters corresponding to channel conditions associated with the communication link between signal forwarding device 138 and destination device 114. The first set of encoding parameters comprises a first encoding technique and/or a first encoding rate. The result of encoding the user data block 160 with Encoder 1 is an encoded first set of data (e.g., encoded user data block).

A second CRC value (CRC 2) 166 is added to the encoded first set of data. Although a CRC is used for CRC 2, any suitable alternative error-detection technique may be used in place of CRC 2. The encoded first set of data, along with CRC 2, is encoded by Encoder 2, 168, which, in the example shown in FIG. 1B, utilizes a non-iterative type encoding/decoding (e.g., Reed-Solomon Codes) to ensure low-latency processing at signal forwarding device 138. Encoder 2 encodes the encoded first set of data according to a second set of encoding parameters corresponding to channel conditions associated with the communication link between origination device 110 and signal forwarding device 138. The second set of encoding parameters comprises a second encoding technique and/or a second encoding rate. The result of encoding the encoded first set of data with Encoder 2 is a dual-encoded first set of data.

One of the advantages of dual-encoding the data is that the encoding parameters selected for each stage of encoding can be selected based on the channel conditions for a particular communication link. For example, Encoder 1 may encode the first set of data according to a first encoding technique that is better suited for transmissions between a signal forwarding device and a destination device (e.g., mobile UE device), and Encoder 2 may encode the encoded set of data according to a second encoding technique that is better suited for transmissions between an origination device (e.g., base station) and a signal forwarding device. For example, the first encoding technique may be a convolutional coding, which is better suited for transmissions between a signal forwarding device and a destination device, and the second encoding technique may be a turbo coding or the Low Density Panty Codes (LDPC), which is better suited for transmissions between an origination device and a signal forwarding device. However, any of the channel coding techniques may be used for the origination device-to-signal forwarding device channel or the signal forwarding device-to-destination device channel.

Similarly, Encoder 1 may encode the first set of data at a first coding rate that is better suited for transmissions between a signal forwarding device and a destination device (e.g., mobile UE device), and Encoder 2 may encode the encoded set of data at a second coding rate that is better suited for transmissions between an origination device (e.g., base station) and a signal forwarding device. More specifically, the first set of data may be encoded at a 1/3 coding rate, and the encoded set of data may be encoded at a 2/3 coding rate, for example.

Regardless of the particular encoding parameters used, the dual-encoded first set of data is modulated by modulator 170 of origination device 110. In the example shown in FIG. 1B, Quadrature Amplitude Modulation (QAM) is used. However, any other suitable modulation scheme may be used. Moreover, the modulation scheme utilized by modulator 170 may also be selected based on the channel conditions between origination device 110 and signal forwarding device 138. The modulation of the dual-encoded first set of data yields a dual-encoded received signal 136.

Origination device 110 utilizes transmitter 122 to transmit the dual-encoded received signal 136 to signal forwarding device 138, which receives the transmission via receiver 142. The demodulator 172 of signal forwarding device 138 demodulates the dual-encoded received signal 136 using a demodulation scheme that corresponds to the modulation scheme utilized by modulator 170. The demodulation of the dual-encoded received signal 136 yields the dual-encoded first set of data.

The Decoder 2, 174, decodes the dual-encoded first set of data, using decoding parameters that correspond to the second set of encoding parameters, which were used by Encoder 2, 168, of origination device 110 to encode the encoded first set of data. The result of decoding the dual-encoded first set of data with Decoder 2 is a single-encoded first set of data that is encoded according to the first set of encoding parameters. After decoding, the second CRC value (CRC 2), which was added to the encoded first set of data by origination device 110, is checked by CRC 2 Check 176, which detects whether any errors are present in the single-encoded first set of data after decoding. If the CRC 2 Check 176 detects an error, signal forwarding device 138 can send a negative acknowledgment response (NACK) to origination device 110, indicating that the dual-encoded received signal 136 was not successfully received. If the CRC 2 Check 176 does not detect an error, signal forwarding device 138 can send a positive acknowledgment response (ACK) to origination device 110, indicating that the dual-encoded received signal 136 was successfully received.

If there are no errors, modulator 178 of signal forwarding device 138 modulates the single-encoded first set of data. In the example shown in FIG. 1B, Quadrature Amplitude Modulation (QAM) is used by modulator 178. However, any other suitable modulation scheme may be used. Moreover, the modulation scheme utilized by modulator 178 may also be selected based on the channel conditions between signal forwarding device 138 and destination device 114. The modulation of the single-encoded first set of data yields a single-encoded forwarded signal 148.

Signal forwarding device 138 utilizes transmitter 146 to transmit the single-encoded forwarded signal 148 to destination device 114, which receives the transmission via receiver 130. The demodulator 180 of destination device 114 demodulates the single-encoded forwarded signal 148 using a demodulation scheme that corresponds to the modulation scheme utilized by modulator 178. The demodulation of the single-encoded forwarded signal 148 yields the single-encoded first set of data.

The Decoder 1, 182, decodes the single-encoded first set of data, using decoding parameters that correspond to the first set of encoding parameters, which were used by Encoder 1, 164, of origination device 110 to encode the first set of data. The result of decoding the single-encoded first set of data with Decoder 1 is the first set of data. After decoding, the first CRC value (CRC 1), which was added to the first set of data by origination device 110, is checked by CRC 1 Check 184, which detects whether any errors are present in the first set of data after decoding.

If the CRC 1 Check 184 detects an error, destination device 114 can send a negative acknowledgment response (NACK) to signal forwarding device 138 and/or origination device 110, indicating that the single-encoded forwarded signal 148 was not successfully received. If destination device 114 sends a NACK to origination device 110, the NACK can be sent either directly to origination device 110 or to origination device 110 via signal forwarding device 138. If the CRC 1 Check 184 does not detect an error, destination device 114 can send a positive acknowledgment response (ACK) to signal forwarding device 138 and/or origination device 110, indicating that the single-encoded forwarded signal 148 was successfully received. If destination device 114 sends an ACK to origination device 110, the ACK can be sent either directly to origination device 110 or to origination device 110 via signal forwarding device 138. If there are no errors detected by CRC 1 Check 184, destination device 114 has successfully received and decoded the first set of data (e.g., received user data block 186).

By dual-encoding the first set of data at origination device 110 with first and second sets of encoding parameters that are selected based on the channel conditions associated with (1) the communication link between signal forwarding device 138 and destination device 114, and (2) the communication link between origination device 110 and signal forwarding device 138, respectively, a more robust data delivery system is created.

Returning now to the example shown in FIG. 1A, origination device 110 transmits a dual-encoded received signal 136 (e.g. a downlink signal) to the signal forwarding device 138, which receives the dual-encoded received signal 136 via antenna 140 and receiver 142. Signal forwarding device 138 further comprises controller 144 and transmitter 146, as well as other electronics, hardware, and code. Signal forwarding device 138 is any fixed, mobile, or portable equipment that performs the functions described herein. The various functions and operations of the blocks described with reference to signal forwarding device 138 may be implemented in any number of devices, circuits, or elements. Two or more of the functional blocks may be integrated in a single device, and the functions described as performed in any single device may be implemented over several devices.

For the example shown in FIG. 1A, signal forwarding device 138 may be a fixed device or apparatus that is installed at a particular location at the time of system deployment. Examples of such equipment include fixed base stations or fixed transceiver stations. In some situations, the signal forwarding device 138 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer.

In still other situations, signal forwarding device 138 may be a portable device that is not fixed to any particular location. Accordingly, signal forwarding device 138 may be a portable user device such as a UE device in some circumstances. In some implementations, signal forwarding device 138 may be a base station, eNB, or access point that performs signal forwarding functions in addition to serving UE devices. For example, a self-backhauled eNB, connected to an anchor eNB, may be configured to perform signal forwarding functions for some UE devices in addition to directly serving other UE devices utilizing the wireless backhaul to origination device 110 (e.g., anchor eNB). In other implementations, signal forwarding device 138 may be a drone with cellular capability. Such a drone can easily move about towards locations where the existing coverage from fixed base stations is lacking.

Controller 144 includes any combination of hardware, software, and/or firmware for executing the functions described herein as well as facilitating the overall functionality of signal forwarding device 138. An example of a suitable controller 144 includes code running on a microprocessor or processor arrangement connected to memory. Transmitter 146 includes electronics configured to transmit wireless signals. In some situations, transmitter 146 may include multiple transmitters. Receiver 142 includes electronics configured to receive wireless signals. In some situations, receiver 142 may include multiple receivers. Receiver 142 and transmitter 146 receive and transmit signals, respectively, through antenna 140. Antenna 140 may include separate transmit and receive antennas. In some circumstances, antenna 140 may include multiple transmit and receive antennas.

Transmitter 146 and receiver 142 in the example of FIG. 1A perform radio frequency (RF) processing including modulation and demodulation. Receiver 142, therefore, may include components such as low noise amplifiers (LNAs) and filters. Transmitter 146 may include filters and amplifiers. Other components may include isolators, matching circuits, and other RF components. These components in combination or cooperation with other components perform the signal forwarding functions. The required components may depend on the particular signal forwarding scheme that is employed.

Transmitter 146 includes modulator 178 (shown in FIG. 1B), and receiver 142 includes demodulator 172 (shown in FIG. 1B). Modulator 178 modulates the signals to be transmitted as part of the single-encoded forwarded signal 148 and can apply any one of a plurality of modulation orders. Demodulator 172 demodulates the dual-encoded received signal 136 in accordance with one of a plurality of modulation orders. The modulation order for transmissions to the destination device 114, however, is established by scheduler 132.

As is known, the modulation order determines the number of bits used to generate the modulated symbol. There is a trade-off between modulation order, required energy, and bit-error rate (BER). As the modulation order is increased, the average energy per bit must also be increased to maintain the same BER. In the example shown in FIG. 1B, signal forwarding device 138 utilizes a lower-order modulation symbol to modulate the single-encoded first set of data before transmitting the single-encoded forwarded signal 148. This scenario occurs because a typical link between signal forwarding device 138 and destination device 114 has a relatively lower signal-to-noise ratio (SNR) compared to the link between origination device 110 and signal forwarding device 138. In some situations, for example, the origination device-to-signal forwarding device (OD-SFD) channel between the origination device 110 and the signal forwarding device 138 is typically static because both devices are fixed, whereas the signal forwarding device-todestination device (SFD-DD) channel between signal forwarding device 138 and destination device 114 is generally dynamic because destination device 114 is mobile. Accordingly, origination device 110 may utilize a higher-order modulation order when the communication link between origination device 110 and signal forwarding device 138 is static, which yields a relatively higher SNR compared to the communication link between signal forwarding device 138 and destination device 114.

As described above, signal forwarding device 138 receives the dual-encoded received signal 136 with antenna 140 and receiver 142. Signal forwarding device 138 demodulates the dual-encoded received signal 136 with demodulator 172 of FIG. 1B, which yields the dual-encoded first set of data. The dual-encoded first set of data is decoded with Decoder 2, 174, of FIG. 1B, which yields a single-encoded first set of data. The single-encoded first set of data is modulated with modulator 178 of FIG. 1B, which yields a single-encoded forwarded signal 148.

Signal forwarding device 138 transmits the single-encoded forwarded signal 148 via transmitter 146 and antenna 140 to destination device 114. In this manner, signal forwarding device 138 transmits the single-encoded first set of data, which is contained in the single-encoded forwarded signal 148, to destination device 114. For the examples discussed herein, the single-encoded forwarded signal 148 is transmitted within a single frequency band of the SFD-DD channel. The incoming dual-encoded received signal 136 is transmitted within an origination device-to-signal forwarding device channel (OD-SFD channel), which also includes a single frequency band. However, any combination of frequency bands and frequency sub-bands may be used for the OD-SFD channel and the SFD-DD channel.

In some examples, upon receiving the dual-encoded received signal 136, the controller 144 of signal forwarding device 138 is configured to measure the dual-encoded received signal 136 to obtain channel measurements associated with the OD-SFD channel between origination device 110 and signal forwarding device 138. After measuring the dual-encoded received signal 136, transmitter 146 of signal forwarding device 138 transmits the OD-SFD channel measurements to origination device 110. The OD-SFD channel measurements are transmitted to origination device 110, shown as relaying information 154 in FIG. 1A. In this manner, origination device 110, using receiver 118, receives channel feedback regarding the channel conditions associated with the communication link between origination device 110 and signal forwarding device 138. Of course, in other examples, origination device 110 can also obtain its own channel measurements regarding the channel conditions associated with the communication link between origination device 110 and signal forwarding device 138 by measuring incoming signals from signal forwarding device 138. After receiving the channel feedback, controller 120 of origination device 110 can modify the set of encoding parameters used by Encoder 2, 168, based on the received channel feedback regarding the channel conditions associated with the communication link between origination device 110 and signal forwarding device 138.

Destination device 114 receives the single-encoded forwarded signal 148 via antenna 124 and receiver 130. The destination device 114 further comprises controller 128 and transmitter 126, as well as other electronics, hardware, and code. Destination device 114 is any fixed, mobile, or portable equipment that performs the functions described herein. The various functions and operations of the blocks described with reference to destination device 114 may be implemented in any number of devices, circuits, or elements. Two or more of the functional blocks may be integrated in a single device, and the functions described as performed in any single device may be implemented over several devices.

Controller 128 includes any combination of hardware, software, and/or firmware for executing the functions described herein as well as facilitating the overall functionality of destination device 114. An example of a suitable controller 128 includes code running on a microprocessor or processor arrangement connected to memory. Transmitter 126 includes electronics configured to transmit wireless signals. In some situations, transmitter 126 may include multiple transmitters. Receiver 130 includes electronics configured to receive wireless signals. In some situations, receiver 130 may include multiple receivers. Receiver 130 and transmitter 126 receive and transmit signals, respectively, through antenna 124. Antenna 124 may include separate transmit and receive antennas. In some circumstances, antenna 124 may include multiple transmit and receive antennas.

Transmitter 126 and receiver 130 in the example of FIG. 1A perform radio frequency (RF) processing including modulation and demodulation. Receiver 130, therefore, may include components such as low noise amplifiers (LNAs) and filters. Transmitter 126 may include filters and amplifiers. Other components may include isolators, matching circuits, and other RF components. These components in combination or cooperation with other components perform the destination device functions. The required components may depend on the particular functionality required by the destination device.

Transmitter 126 includes a modulator (not shown), and receiver 130 includes demodulator 180 (shown in FIG. 1B). The modulator modulates the signals to be transmitted as part of the relaying information signals 150, 152 and can apply any one of a plurality of modulation orders. The demodulator demodulates the single-encoded forwarded signal 148 in accordance with one of a plurality of modulation orders.

As described above, destination device 114 receives the single-encoded forwarded signal 148 with antenna 124 and receiver 130. Destination device 114 demodulates the single-encoded forwarded signal 148 with demodulator 180 of FIG. 1B, which yields the single-encoded first set of data. The single-encoded first set of data is decoded with Decoder 1, 182, of FIG. 1B, which yields the first set of data (e.g., received user data block 186).

In some examples, upon receiving the single-encoded forwarded signal 148, controller 128 of the destination device 114 is configured to measure the single-encoded forwarded signal 148 to obtain channel measurements associated with a signal forwarding device-to-destination device (SFD-DD) channel between signal forwarding device 138 and destination device 114. After measuring the single-encoded forwarded signal 148, transmitter 126 of destination device 114 transmits the SFD-DD channel measurements to origination device 110. The SFD-DD channel measurements can be transmitted directly to origination device 110, as indicated by relaying information signal 150 in FIG. 1A. Alternatively, the SFD-DD channel measurements can be initially transmitted to signal forwarding device 138, as indicated by relaying information signal 152, and signal forwarding device 138 can subsequently transmit the SFD-DD channel measurements to origination device 110, as indicated by relaying information signal 154. Of course, in other examples, signal forwarding device 138 can also obtain its own channel measurements regarding the channel conditions associated with the communication link between signal forwarding device 138 and destination device 114 by measuring incoming signals from destination device 114. Signal forwarding device 138 may then transmit its own channel measurements (e.g., relaying information 154) to origination device 110. Thus, there are multiple ways in which origination device 110, using receiver 118, can receive channel feedback regarding the channel conditions associated with the communication link between signal forwarding device 138 and destination device 114. After receiving the channel feedback, controller 120 of origination device 110 can modify the set of encoding parameters used by Encoder 1, 164, based on the received channel feedback regarding the channel conditions associated with the communication link between signal forwarding device 138 and destination device 114.

In some examples, destination device 114 can also transmit the SFD-DD channel measurements to origination device 110, either directly or indirectly through signal forwarding device 138, as part of a feedback signal. Alternatively, the SFD-DD channel measurements can be transmitted separately from the feedback signal. For example, the feedback signal can include a downlink channel feedback report comprising downlink channel measurements related to one or more downlink signals received by destination device 114. For example, the downlink channel feedback report may contain downlink channel measurements for downlink signals received from origination device 110 and/or downlink channel measurements for one or more downlink signals received from one or more base stations other than origination device 110. The downlink channel feedback report can additionally include the location of the resources (e.g., time slots, subcarriers, reference signal, etc.) on which the downlink channel measurements were made.

The downlink channel feedback report may also identify a carrier on which the downlink channel measurements were made, a cell identifier associated with origination device 110 that transmitted the downlink signals, and/or a spatial vector associated with a beamformed downlink signal. In some examples, the downlink channel feedback report may identify a cell identifier associated with a base station, other than origination device 110, that transmitted the downlink signal. This scenario might occur when the downlink signal is received from a base station other than origination device 110, but the destination device 114 needs to submit the downlink channel feedback report to the scheduler 132 located at origination device 110.

In yet another scenario, destination device 114 can receive downlink signals from a first device (e.g., origination device 110), as the primary carrier of the downlink signals, and can also receive downlink signals from a second device (e.g., signal forwarding device 138 or a base station other than origination device 110), as the secondary carrier of the downlink signals. In such a scenario, the downlink channel feedback report may (1) identify the primary carrier and/or the secondary carrier on which the downlink channel measurements were made, (2) include a cell identifier associated with the first device that transmitted the primary carrier and/or a cell identifier associated with the second device that transmitted the secondary carrier, and/or (3) include a spatial vector associated with each of one or more beamformed downlink signals, respectively.

Alternatively, the feedback signal can include an acknowledgment response, which can be either a positive acknowledgment response (ACK) or a negative acknowledgment response (NACK). The ACK message indicates that a downlink signal was successfully received by destination device 114. The NACK message indicates that the downlink signal was not successfully received by destination device 114. In some situations, the ACK/NACK message is a message that is forwarded on to origination device 110 by signal forwarding device 138. In other situations, it a message intended for signal forwarding device 138. In still other situations, the ACK message can be an indication to both signal forwarding device 138 and origination device 110. In scenarios in which the feedback signal includes an acknowledgment response, the feedback signal may additionally identify a carrier on which the downlink signal was received, a cell identifier associated with origination device 110 that transmitted the downlink signal, a cell identifier associated with a base station, other than origination device 110, that transmitted the downlink signal, and/or a spatial vector associated with a beamformed downlink signal. Regardless of the contents of the feedback signal, the SFD-DD channel measurements can be transmitted along with, or separate from, the feedback signal to origination device 110, either directly or through signal forwarding device 138.

Figure 1C:
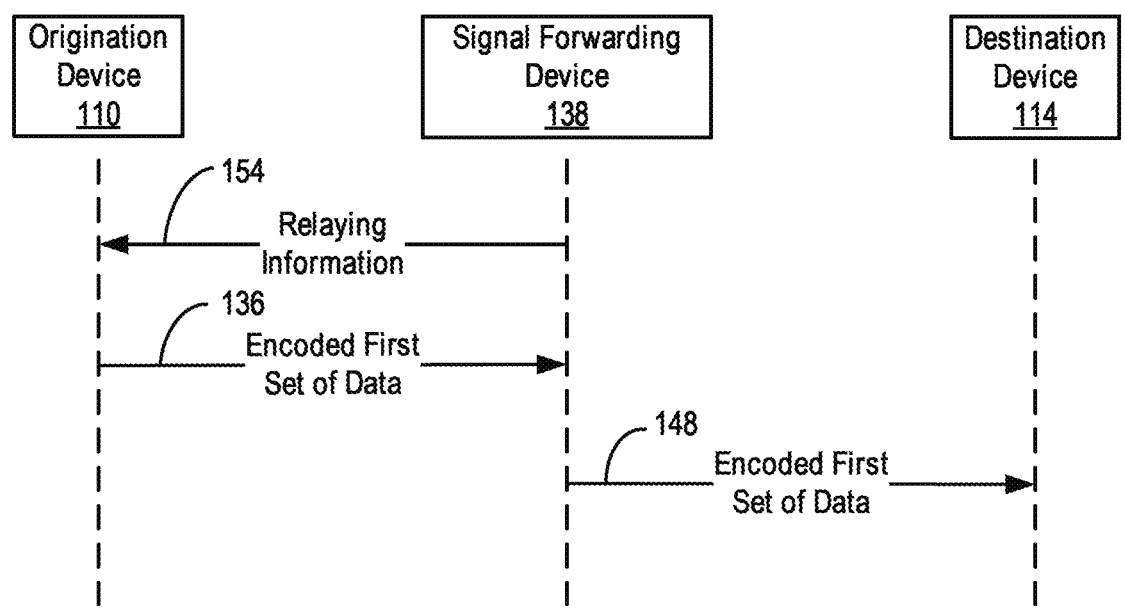
FIG. 1C is a messaging diagram of an example of the messages exchanged between the various system components shown in FIG. 1A.

FIG. 1C is a messaging diagram of an example of the messages exchanged between the various system components shown in FIG. 1A. In this example, signal forwarding device 138 transmits relaying information to origination device 110, via signal 154. However, in other examples, origination device 110 may receive relaying information, directly or indirectly, from destination device 114. As described above, the relaying information can include (1) information associated with one or more communication links in system 100, and (2) utilized to relay information from origination device 110 to destination device 114, via signal forwarding device 138. In some cases, origination device 110 receives the relaying information in a grant, and in other cases, origination device 110 receives the relaying information in a broadcast message.

Upon receipt of the relaying information 154, origination device 110 determines a first set of encoding parameters corresponding to the relaying information associated with the communication link between signal forwarding device 138 and destination device 114. In some cases, origination device 110 also determines a second set of encoding parameters corresponding to the relaying information associated with the communication link between origination device 110 and signal forwarding device 138.

In a single-encoded scenario, origination device 110 encodes a first set of data, according to the first set of encoding parameters corresponding to the relaying information associated with the communication link between signal forwarding device 138 and destination device 114, to form an encoded set of data. In a dual-encoded scenario, the origination device 110 encodes the encoded set of data, according to the second set of encoding parameters corresponding to the relaying information associated with the communication link between origination device 110 and signal forwarding device 138, to form a dual-encoded set of data.

Origination device 110 transmits the encoded set of data to signal forwarding device 138, via signal 136. The encoded set of data may be single-encoded or dual-encoded. If the encoded set of data is single-encoded, signal forwarding device 138 transmits the encoded set of data to destination device 114, via signal 148. In some cases, signal 148 is a retransmission of signal 136. In other cases, signal 148 is a modified version of signal 136. If the encoded set of data is dual-encoded, signal forwarding device 138 will decode the dual-encoded set of data, as described above, to form a single-encoded set of data that is transmitted to destination device 114, via signal 148.

Figure 2:
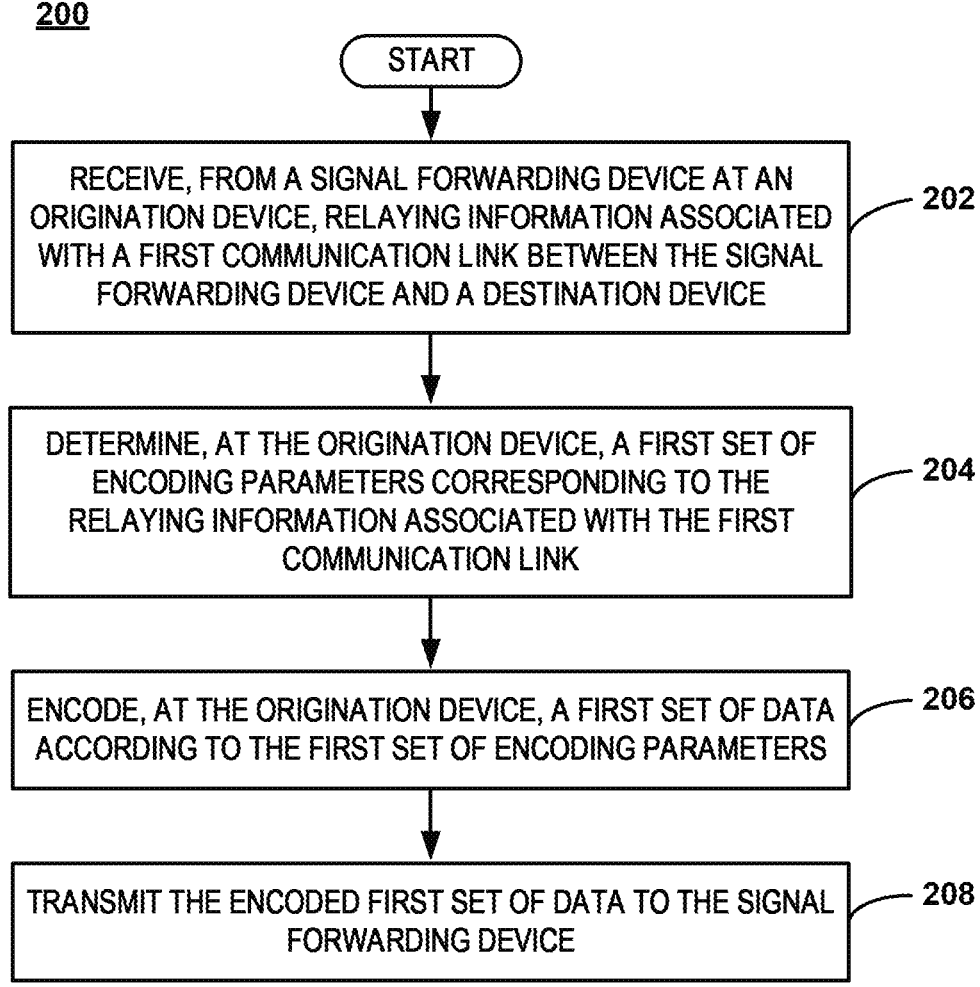
FIG. 2 is a flowchart of an example of a method of utilizing the wireless communication system of FIG. 1A.

FIG. 2 is a flowchart of an example of a method 200 of utilizing the wireless communication system of FIG. 1A. The method begins, at step 202, with receiving, from a signal forwarding device at an origination device, relaying information associated with a first communication link between the signal forwarding device and a destination device. As described above, the relaying information may be received in a grant message or in a broadcast message from the signal forwarding device.

At step 204, the origination device determines a first set of encoding parameters that correspond to the relaying information associated with the first communication link between the signal forwarding device and a destination device. If the system is configured to dual-encode the user data to be transmitted by the origination device, the origination device will also determine a second set of encoding parameters that correspond to relaying information associated with a second communication link between the origination device and the signal forwarding device.

At step 206, the origination device encodes a first set of data according to the first set of encoding parameters to generate an encoded first set of data. If the system is configured to dual-encode the user data, the origination device will encode the encoded first set of data according to the second set of encoding parameters to generate a dual-encoded first set of data.

At step 208, the origination device transmits an encoded received signal, which contains the encoded first set of data, to the signal forwarding device. In some cases, the first set of data is single-encoded. In other cases, the first set of data is dual-encoded.

If the encoded set of data is single-encoded, the signal forwarding device transmits the encoded set of data to the destination device. In some cases, the transmission of the encoded set of data from the signal forwarding device to the destination device is a retransmission of the encoded received signal, which was received by the signal forwarding device from the origination device. In other cases, the transmission of the encoded set of data from the signal forwarding device to the destination device is a modified version of the encoded received signal, which was received by the signal forwarding device from the origination device. If the encoded set of data received by the signal forwarding device is dual-encoded, the signal forwarding device will decode the dual-encoded set of data, as described above, to form a single-encoded set of data that is transmitted to the destination device 114.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   receiving, from a signal forwarding device at an origination device, relaying information associated with a first communication link between the signal forwarding device and a destination device, wherein receiving the relaying information associated with the first communication link between the signal forwarding device and a destination device comprises receiving the relaying information in a grant granting permission to the origination device to transmit to the signal forwarding device; and
   encoding, at the origination device, a first set of data, according to a first set of encoding parameters corresponding to the relaying information associated with the first communication link.

2. The method of claim 1, wherein the relaying information associated with the first communication link comprises at least one of the following: a Channel Quality Indicator pertaining to the first communication link, and a first encoding rate based on channel conditions associated with the first communication link.

3. The method of claim 1, further comprising:
   determining, at the origination device, the first set of encoding parameters corresponding to the relaying information associated with the first communication link.

4. The method of claim 1, further comprising:
   transmitting the encoded first set of data to the signal forwarding device.

5. The method of claim 1, further comprising:
   encoding, at the origination device, the encoded first set of data, according to a second set of encoding parameters corresponding to relaying information associated with a second communication link between the origination device and the signal forwarding device, to generate a dual-encoded first set of data.

6. The method of claim 5, further comprising:
   transmitting the dual-encoded first set of data to the signal forwarding device.

7. A wireless communication device comprising:
   a receiver configured to receive, from a signal forwarding device, relaying information associated with a first communication link between the signal forwarding device and a destination device, wherein the receiver is configured to receive the relaying information associated with the first communication link between the signal forwarding device and the destination device in a grant from the signal forwarding device, the grant granting permission to the wireless communication device to transmit to the signal forwarding device; and
   a controller configured to encode a first set of data, according to a first set of encoding parameters corresponding to the relaying information associated with the first communication link.

8. The wireless communication device of claim 7, wherein the relaying information associated with the first communication link comprises at least one of the following: a Channel Quality Indicator pertaining to the first communication link, and a first encoding rate based on channel conditions associated with the first communication link.

9. The wireless communication device of claim 7, wherein the controller is further configured to determine the first set of encoding parameters corresponding to the relaying information associated with the first communication link.

10. The wireless communication device of claim 7, further comprising:
    a transmitter configured to transmit the encoded first set of data to the signal forwarding device.

11. The wireless communication device of claim 7, wherein the controller is further configured to encode the encoded first set of data, according to a second set of encoding parameters corresponding to relaying information associated with a second communication link between the wireless communication device and the signal forwarding device, to generate a dual-encoded first set of data.

12. The wireless communication device of claim 11, further comprising:
a transmitter configured to transmit the dual-encoded first set of data to the signal forwarding device.

13. A wireless communication system comprising:
a signal forwarding device comprising a transmitter configured to transmit relaying information associated with a first communication link between the signal forwarding device and a destination device; and
an origination device comprising:
a receiver configured to receive, from the signal forwarding device, the relaying information associated with the first communication link between the signal forwarding device and the destination device, wherein the receiver of the origination device is configured to receive the relaying information associated with the first communication link between the signal forwarding device and the destination device in a grant from the signal forwarding device, the grant granting permission to the origination device to transmit to the signal forwarding device; and
a controller configured to encode a first set of data, according to a first set of encoding parameters corresponding to the relaying information associated with the first communication link.

14. The wireless communication system of claim 13, wherein the relaying information associated with the first communication link comprises at least one of the following: a Channel Quality Indicator pertaining to the first communication link, and a first encoding rate based on channel conditions associated with the first communication link.

15. The wireless communication system of claim 13, wherein the controller of the origination device is further configured to determine the first set of encoding parameters corresponding to the relaying information associated with the first communication link.

16. The wireless communication system of claim 13, wherein the origination device further comprises a transmitter configured to transmit the encoded first set of data to the signal forwarding device.

17. The wireless communication system of claim 13, wherein the controller of the origination device is further configured to encode the encoded first set of data, according to a second set of encoding parameters corresponding to relaying information associated with a second communication link between the origination device and the signal forwarding device, to generate a dual-encoded first set of data.

18. The wireless communication system of claim 17, wherein the origination device further comprises a transmitter configured to transmit the dual-encoded first set of data to the signal forwarding device.

\* \* \* \* \*